Nov. 5, 1935.   N. C. SCHELLENGER   2,019,997
CIRCUIT CONTROLLER
Filed Feb. 25, 1931   4 Sheets-Sheet 1

Inventor:
Newton C. Schellenger

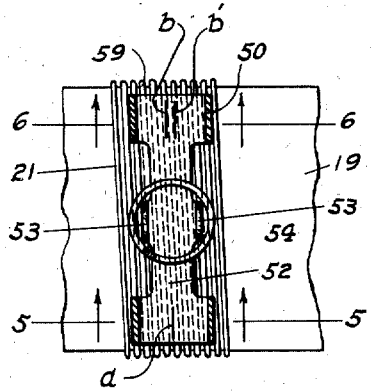
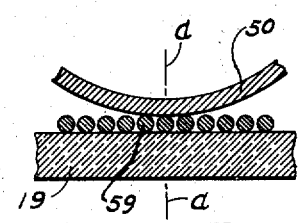
Fig. 4a
Fig. 5.
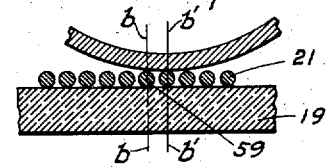
Fig. 6.
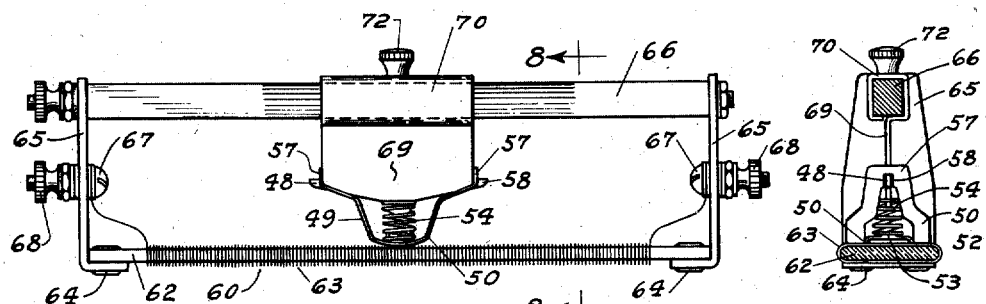
Fig. 7.
Fig. 8.
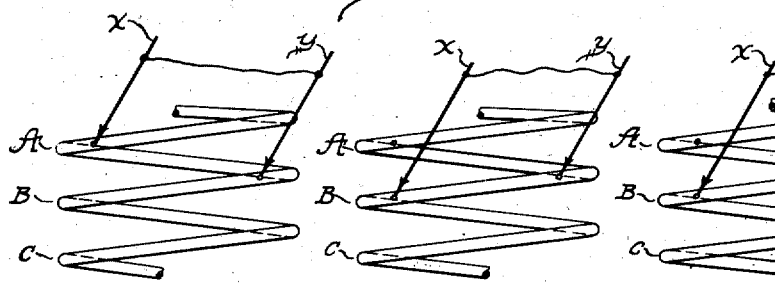
Fig. 9.    Fig. 10.    Fig. 11.
Inventor:
Newton C. Schellenger
By Harry Langsam
Att'y.

Inventor:
Newton C. Shellenger
By Harry Langeam
Att'y.

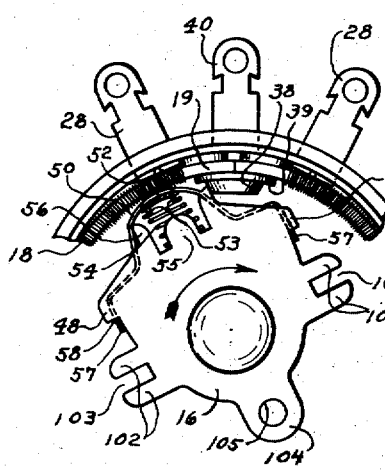
Fig: 15.
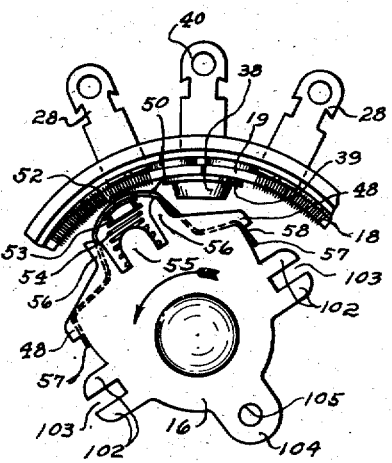
Fig: 16.
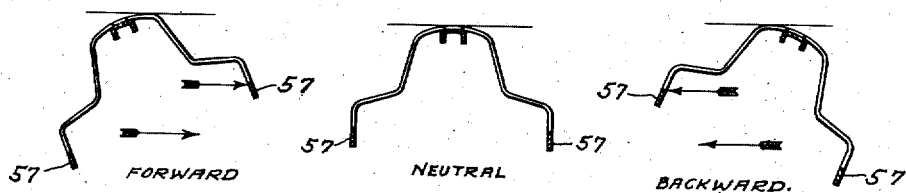
Fig: 17.  Fig: 18.  Fig: 19.
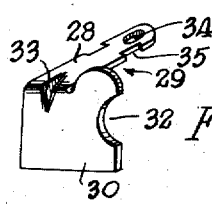
Fig: 20.
Inventor:
Newton C. Schellenger.
By: Harry Langsam
Att'y:

Patented Nov. 5, 1935

2,019,997

UNITED STATES PATENT OFFICE 2,019,997

CIRCUIT CONTROLLER

Newton C. Schellenger, Elkhart, Ind., assignor to Chicago Telephone Supply Company, Elkhart, Ind., a corporation of Indiana Application February 25, 1931, Serial No. 518,281

23 Claims. (Cl. 201—55)

My invention relates to circuit controllers. While the preferred embodiment herein disclosed is a variable resistor of the wire wound type, the invention is not to be thereby limited as the principles and teachings of the invention are applicable to contact making devices generally.

Heretofore the type of variable resistor in most common use has been constructed of a resistance wire wound upon a flat strip or bar of insulating material hereinafter referred to as the resistance strip, which strip is brought to a cylindrical shape substantially concentric with a shaft upon which a contact arm is fixed, the contact arm bearing upon the convolutions of the winding along the edge of the strip, usually under the spring pressure of the arm itself.

The outstanding defect encountered in devices of this type is the lack of a reasonably uniform contact resistance between the contactor and the turns of the wire, especially when the contactor is being moved. In order to provide a relatively low contact resistance between these parts it was previously thought desirable either to provide a wider contact blade, or to increase the pressure between the two contact surfaces. To increase the width of the contactor does not cure the difficulty, because any variation in the height of the convolutions of wire forming the raceway for the contactor, even if slight, will cause the contactor to bridge a variable number of wire convolutions, that is, the contactor will fail to make contact with a variable number of turns of wire wherever such variations exist in the height of wires forming the raceway of the contactors, resulting in sudden and wide variations in resistance which are highly undesirable. Furthermore, the raceway of the contactor is relatively narrow because a thick winding strip is difficult to fabricate, lacks the flexibility necessary to its being economically formed into an arcuate shape, and the cost of the added material would be high. For these reasons the winding strips now employed in small commercial rheostats are comparatively thin, ranging from about 1/32 of an inch to 3/64 of an inch in thickness. These winding strips are cut from sheets of laminated phenolic compound, or vulcanized fibre sheets after which the edges of the strips are rounded and made as smooth and uniform as possible. It will be seen that the convolutions of wire bend around these strip edges at a relatively sharp angle, each wire turn presenting a sharply convexed surface to the contactor and thereby forming the raceway. Under these conditions, it will be seen that the contactor can have but a point contact with each convolution. Furthermore, the smoothness and accuracy of the raceway becomes more critical as the size of the resistance wire becomes smaller and the spacing between convolutions becomes less. To overcome these difficulties, present practice is to increase the pressure between the contactor and the convolutions of wire, which in effect is an attempt to wear down unevenness of the raceway. This causes undue wear and scoring with consequent short life for the rheostat and wide variations in contact resistance due to the rough, scored, contacting surfaces.

The difficulties encountered in evenly spacing the convolutions of resistance wire on the edge of a thin strip and in maintaining them at a uniform height along the edge tends to give a difference in the resistance to movement of the sliding contactor which causes it to operate roughly and erratically. In the case of a rheostat operating in a circuit employing relatively heavy currents and requiring accurate control, such as is necessary in electro-therapy apparatus, a variable or high contact resistance results in heating, rapid oxidation and arcing which not only greatly reduces the life of the unit, but causes objectionable and uneven variations in the resistance of the circuit.

I have conceived the possibility of improving the contact by increasing the surface of engagement along the length of one turn of wire rather than by increasing the extent of bridging across several turns of the wire. I do this preferably by working upon such parts of the resistance strip, which are subject to less variation than the edge of the resistance strip or wires along or adjacent this edge. I have found that the coils of the resistance wire along the wide cylindrical surfaces adjacent the edges of the resistance strip are held securely and are more nearly uniform in height and spacing than on the edge of the resistance strip. This strip may also be held to a cylindrical form without altering the uniformity of the winding on the inner cylindrical surface.

I am aware that it has been proposed to provide a contactor bearing along the cylindrical surface of a wire wound resistor strip and I do not claim that feature as constituting my invention, but all prior devices with which I am familiar have employed a relatively high pressure contact bearing along the central part of the turns of the wire where the turns are least supported and the contact in such devices is pushed across the turns.

There are embodied in the construction of the preferred form of rheostat herein disclosed a large number of improvements all contributing to the successful performance of the device in greater or less degree and capable not only of conjoint use and advantage but also of individual use and advantage in this art.

The rheostat of my invention is characterized by a mechanically smooth noiseless action with uniform low contact resistance whether the contactor be in motion or at rest. The changes in resistance are so smoothly, accurately and gradually made that arcing or erratic functioning of associated apparatus because of defects in the rheostat control, cease to be problems.

It is further characterized by extremely long life. Fatigue tests show that rheostats of the type herein disclosed may be continuously operated through immense numbers of operations without developing trouble mechanically or electrically.

The rheostat of my invention is further characterized by freedom from all end thrust and consequent wear to which conventional rheostats of this general class are at present subject. This is because the contact pressure is radial with respect to the shaft by which the contactor is operated.

The present rheostat is further characterized by compactness for a given capacity. This is secured by a number of features of improvement all of which will be referred to in detail later.

The rheostat of my invention is further characterized by unusual dependability of operation. The contact is so smoothly and accurately made through the use of improvements hereinafter to be referred to in detail that wear which would change the action or render the rheostat subject to irregular operation does not occur. Lubrication is provided and extraneous matter which might enter the rheostat is carefully excluded both through design of the device and by the enclosure of the working parts thereof. Even if particles of foreign matter should enter the rheostat its operation would not seriously be interfered with.

The rheostat of my invention is further characterized by great ease of operation. Due to the novel construction of the contact making apparatus and the ability to lubricate the same the mechanical resistance to the operation of the device is surprisingly low.

The rheostat of my invention is further characterized by a greater number of steps for a given resistor winding than devices of the prior art. This is secured by the use of the two runners cooperating with the diagonal lay of the wires as will be later described in detail.

The above desirable qualities are secured through the use of certain improvements which individually and collectively are new and which will be set forth more in detail in the following specification and claims. I shall here briefly call attention to some of them.

An improvement of primary importance is the method of and means for making contact which is embodied in the devices disclosed herein. This involves the provision of a novel contact shoe having two runners engaging the turns of the wire on the flat side of the resistance strip near the edges thereof where the wires are firmly held in position. The two runners are convex and provide two substantially line contacts securing an area of contact many times greater than has heretofore been practicable. The total pressure which may be safely carried on such extensive surfaces is much greater than has heretofore been permissible because my construction gives a resultant unit pressure lower than that of devices of the prior art with resultant smoothness of operation, long life, dependability, and a reduction or substantial elimination of wear. This double contactor also serves to increase the number of resistance steps obtainable with a given winding because as it is advanced one contact runner will electrically lead the other by substantially one-half turn due to the pitch of the winding and the alignment of the contact runners. Also, it short circuits less than a half turn of the resistance winding as a minimum, and a whole turn as a maximum.

The novel method of applying spring pressure to the contacting surfaces is peculiarly advantageous. A small helical compression spring applies pressure to the shoe radially halfway between the two runners or contact making faces. This equalizes the pressure on the two runners, and even if a particle of foreign matter should be encountered by one of the runners it would not interfere with certainty of contact of the other runner with the turns of the winding.

Another feature of novelty is the manner of supporting and moving the contact shoe. The actuating member is so arranged as always to pull the shoe, and this is true for motion in either direction. The point of application of the pulling force is well in advance of the bearing faces of the shoes. As a result the contact shoes are free to float radially against the tension of the spring or to rock sufficiently sidewise to secure the desirable actions heretofore mentioned. This applies to motion in either direction. Sufficient play is provided between the actuating member and the shoe to permit the floating and rocking action for motion in either direction.

The novel mechanical construction of the actuator and the shoe and the cooperation with the stop is such as to permit of the utilization of an unusually large part of the circumference of the circle or cylinder defined by the resistance strip.

Another improvement resides in the provision of three electrical conducting paths in parallel between the shoe and the actuator.

Another improvement resides in holding the contact strip in place by expanding it into the shell and utilizing its compression strength for maintaining it in substantially cylindrical form and concentric position.

Another improvement resides in the terminal means and the method of bringing the terminals out from inside of the shell without permitting an opening through which dust or foreign matter might enter. In connection with this feature there is a novel manner of making electrical contact between the terminal and the wire resistor.

Another improvement resides in the provision of a dust-proof case a part of which may be in the form of a cover or a cooperating shell, for completely enclosing the operating parts.

Another improvement resides in the manner of coupling the shells of two cooperating units together, and connecting the actuators for conjoint movement.

Another improvement resides in the provision of a coupling between the actuator member and a conjointly operated switch.

Other improvements reside in the manner of assembly in the construction of individual parts, in the provision of a minimum number of parts for making up a maximum number of combinations, and in other features and elements as will be more evident from the following detailed specification and claims.

Now, in order to acquaint those skilled in the art with the manner of constructing and operating the device embodying my invention, I shall describe in connection with the accompanying drawings a specific embodiment of the invention.

In the drawings,—

Figure 4a is an enlarged fragmentary view of a section taken through the contact shoe illustrating the manner of making contact;

Figure 4:
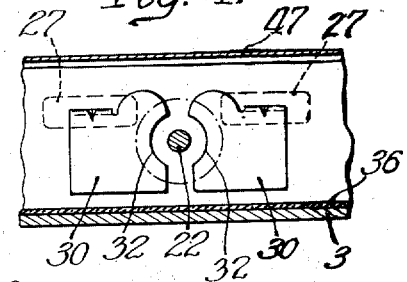
Fig. 4 is a fragmentary section taken on line 4—4 of Fig. 2, showing the manner of mounting the terminals.
Figure 12:
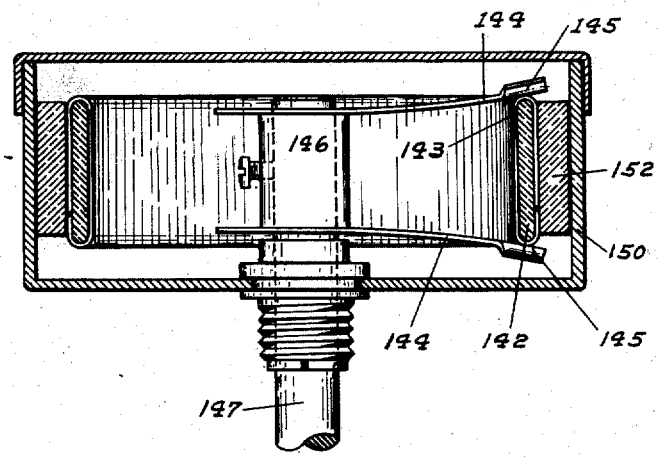
Figure 13:
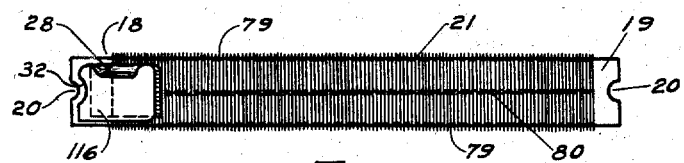
Figure 14:
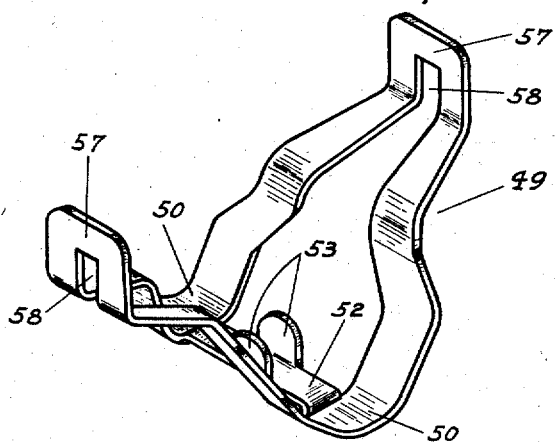

Figures 5 and 6 are enlarged fragmentary views of sections taken on the lines 5—5 and 6—6, respectively, of Fig. 4;

Figure 7 is a side view of another embodiment of my invention;

Figure 8 is a cross-sectional view taken on the line 8—8 of Fig. 7;

Figures 9, 10, and 11 are diagrams illustrating the method of switching involved in my rheostat;

Figure 12 is a transverse sectional view of a modified form of rheostat;

Figure 13 is a plan view of the resistance element showing the convolutions of the resistance wire having a central support;

Figure 14 is a perspective view of the contact shoe;

Fig. 15 is a fragmentary end view showing the relative positions of the actuator and the shoe when the former is moved in a clockwise direction;

Fig. 16 is a similar view showing the relative positions of the members when the actuator is moved in a counterclockwise direction; and Figs. 17, 18, and 19 are fragmentary end views showing the positions which the shoe assumes during the movement of the actuator in the several directions indicated by the legends.

Fig. 20 is an isometric view of a terminal for one end of the resistor.

Throughout the drawings and specification like reference characters indicate like parts.

Figure 3:
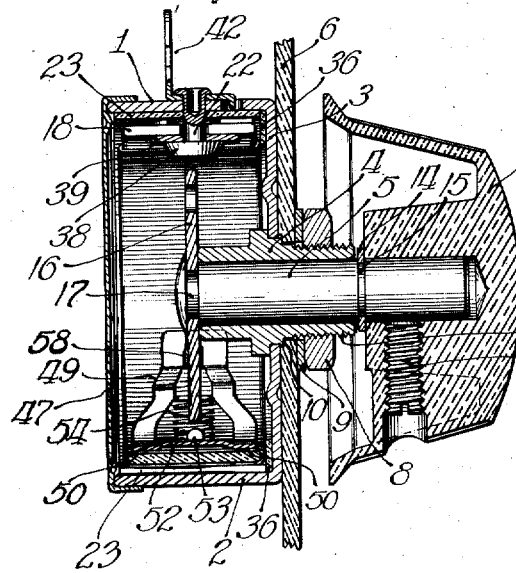
Figure 3 is a vertical longitudinal section through the same.
Figure 1:
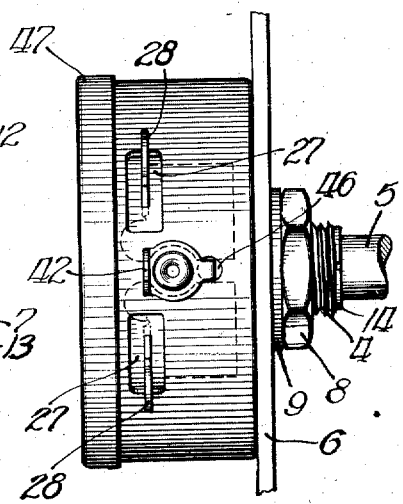
Figure 1 is a top plan view of a rheostat embodying my invention.
Figure 2:
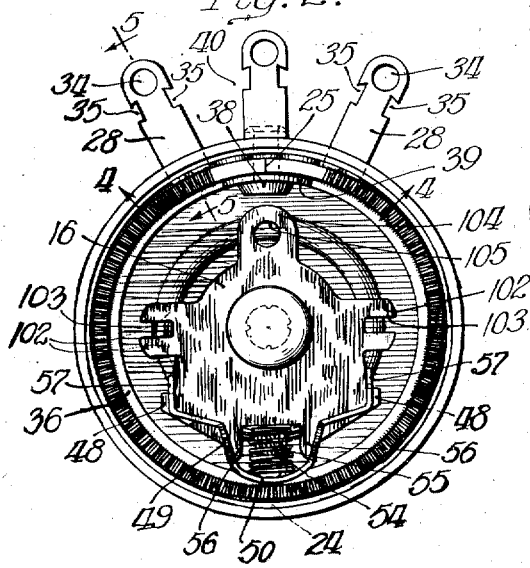
Figure 2 is a rear view of the same with the cap removed.

Referring to the rheostat shown in Figs. 1 to 3,—I provide a cylindrical cup-shaped shell member 1 forming part of a closed housing. The shell has a cylindrical wall 2 and a substantially flat end wall 3. The end wall 3 has a bearing sleeve 4 of brass, bronze or the like secured in an opening in the same. The sleeve 4 is substantially concentric with the cylindrical wall 2 and it serves the dual purpose of mounting the actuating or operating shaft 5 and of supporting the rheostat on a panel 6 which may be a thin plate. The outside of the sleeve is threaded as shown at 7, and it receives a clamping nut 8, a washer 9 being interposed between the nut and the panel. The opening in the end wall 3 preferably has radial projections, and the sleeve is expanded into engagement with the same as by endwise pressure upon the shoulder 10. A suitable knob or operating member 12 is fastened by a set screw 13 to the outer end of the shaft 5. The shaft 5 is held against end play in one direction by means of the flat split ring 14 which is shrunk or deformed into the square groove 15 in the shaft 5 just outside the sleeve 4. At the opposite end of the shaft 5 an actuator or arm 16 in the form of a thin plate of brass or the like is secured by riveting the reduced end of the shaft, as indicated at 17 in Fig. 3. The hole in the actuator is provided with keying projections extending radially inwardly. When the reduced end of the shaft 5 is riveted over, the metal thereof is expanded into keying engagement with said projections. The actuator is held between the shoulder of the shaft and the riveted-over head on the reduced end. This actuator is shown in the rear elevational view in Fig. 2. It limits endwise motion of the shaft outwardly.

The housing contains a cylindrical resistance element 18 (see Figs. 2, 3, and 13) which consists of a strip of laminated phenolic compound 19 of a special composition rendering the same sufficiently flexible to permit bending when hot of the relatively short length which is here employed into cylindrical shape. Upon the strip 19 there is wound a resistance wire. The wire is preferably of great length and of very small diameter. For example, in the embodiment shown in Figs. 1 to 3 the strip 19 may be wound with wire .002 of an inch in diameter with but .0001 of an inch space between turns. Such a resistor has 466 turns of wire per lineal inch of wound strip. The ends of the strip 19 are notched as shown at 20—20 in Fig. 13 to permit the passage of a rivet 22 therethrough, as will be described in detail later.

The inside of the cylindrical wall 2 is provided with a liner or insulating strip of fibre 23 which after dehydration is cut to a length such that it fits snugly against the interior of the cylindrical wall when the ends are brought into register by expanding the same under pressure within the shell or housing. The ends are shown in Fig. 2 opposite the ends of the resistor. The abutting ends of the liner are shown at 24 in Fig. 2. The line of the abutting ends of the resistor is shown at 25 in Fig. 2. The cylindrical wall of the shell as shown in the embodiment of Fig. 1 has a pair of apertures or openings 27, 27 on each side of the meeting ends of the resistor. The fibre liner 23 has slits so spaced as to register with the central parts of the apertures 27, 27, and through these slits and apertures 27, 27 are thrust the lead portions or terminals 28 of terminal members 29. These terminal members 29 are formed of thin springy sheet metal with a base or foot portion 30 extending at substantially right angles to the terminal or lead portion 28. This base portion 30 is cut or notched at 32 to provide clearance around the rivet 22, which rivet is grounded on the shell 1. (See Figs. 4 and 13.)

The terminal portions 28 are adapted to receive connecting wires, and to this end have eyes or openings 34 at their outer ends and also have dovetailed notches 35 adjacent the eyes or openings 34. These dovetailed notches 35 provide a portion of reduced diameter around which still other wires may be connected and thereby held preparatory to being soldered to terminal 28. The sharp corners of the dovetailed notches 35 tend to catch the turns of the wire like barbs and hold the same securely.

A ring or washer 36 of insulation such as fiber is disposed between the end wall 3 of the cup 1 and the resistor 18, as shown in Fig. 3.

It will now be observed that the resistor is not absolutely cylindrical because of the thickness of the base portions 30 between the resistor 18 and the liner 23. However, the approximation is close enough to give a highly satisfactory device, and if a closer approximation is desired pockets may be provided in the wall 2 for these terminals. These pockets may be formed by pressing the walls outwardly in a punch press operation.

The actuator or arm 16 is provided with two hooks or projections or coupling means 48, 48 spaced apart angularly with respect to the axis of the shaft by a relatively wide angle. The actuator 16 carries the shoe member 49 having a pair of runners 50, 50 which are formed integrally of a piece of thin sheet metal of a special composition for insuring good electrical contact with the resistance wire. These runners are of a substantial width axially of the shaft 5 and are formed with cylindrical surfaces or engaging faces which are accurately formed and polished and disposed in axial alignment. Preferably the material of which the shoe is made is nickel silver, but it may be of any electrical conductor possessing good wearing qualities. I have made the entire shoe of one piece, for example, by die stamping but I contemplate withinin my invention making the same up of separate pieces if desired, or making the shoe so as to exert a spring pressure on the wire windings and thereby dispense with the helical spring 54. The shoe may be constructed to give the necessary spring pressure through its own inherent resiliency, the feature of moving the shoe by pulling the same and permitting free floating being nevertheless attainable thereby. The runners are formed on a radius which is considerably less than the radius of curvature of the inside of the winding strip. This prevents any appreciable amount of the winding from being short circuited under the shoe.

The runners 50, 50 are connected by an integral bridging member or equalizer 52 which has ears 53 struck up from the side edges thereof, and this bridge 52 and the ears 53 provide a spring seat for the coiled compression spring 54, the upper end of the spring engaging the edge of the actuator or arm 16 and being guided in place by the projection 55. Stop arms 56 on each side of the spring seat projection 55 on the actuator are adapted to engage the head 38 of the rivet 22 for limiting the motion of the said arm, and consequently its shoe.

The runners 50, 50 have integral extensions terminating in substantially parallel yoke portions 57, 57, these yoke portions having their inner edges terminating in relatively narrow parallel sided slots or coupling apertures, as is illustrated in Fig. 3 at 58. The hooks or projections 48 on the edge of the actuator 16 extend into these narrow slots for the purpose of pulling the shoe in either direction of rotation. The slots 58 at their extremities are sufficiently narrow to guide the shoe to prevent excessive rocking motion sidewise and hold the same upon the actuator for convenient assembly of the parts, but are wide enough to prevent binding in use, and to provide the desired freedom for limited pivotal motion of the shoe upon the projection 48 which is pulling the shoe.

The portions of the shoe between the yoke-shaped ends 57 and the runners are shaped by being bent inwardly so as to assist in clearing the head 38 of the rivet as the actuator stop arms 56 approach the rivet. The slots widen out from the yoke portions 57 toward the runners 50, as will be apparent from Fig. 3, sufficiently to be well clear of the rivet head 38 as it is not desirable to allow the shoe to strike the rivet head for stopping the motion of the shaft. The stop arms 56 strike the rivet head in abutting relation so that there is no tendency to wear off metal particles by the engagement.

It will now be seen that the spring applies pressure on the equalizer bar substantially centrally of the two runners both transversely and rotarily. The hooked engagement between the shoe and the actuator prevents any pushing of the shoe and instead causes the same always to be pulled in the direction of motion of the actuator. Since the point at which the actuator is hooked to the shoe is relatively far angularly in advance of the runners and is disposed at a substantial radial distance from the axis of the shaft, the runners are pulled around in contact with the winding with an unusually small resistance to motion even though the spring pressure be relatively high. The pulling connection is at a central point with respect to the two runners and hence gives an equalized effect. A limited degree of universal motion between the actuator and the shoe is permitted by the above arrangement, and at the same time the shoe may float inwardly or outwardly radially very freely, thereby adapting itself to the different radii which the winding may present, this being particularly desirable in the present construction where the ends of the resistor are at a less radial distance than the main part of the resistor by reason of the interposed bases 30 of the terminal members 29.

The shoe thus has a floating contact and a floating connection with the actuator. Upon a reversal of motion in either direction the small amount of play between the hook 48 and the yoke 57 lying on the side of the runners in the direction of intended motion is taken up by a slight angular motion of the actuator with respect to the shoe as shown for example in Fig. 16. In this figure motion of the actuator 16 in the direction indicated by the arrow is beginning. The compression spring 54 is slightly warped by this allowable angular displacement, but this is immaterial. It will be seen that for motion in the direction of the arrow in Fig. 16 the yoke 57 and hook 48 on the left hand side of the figure form a pivotal connection well in advance of the engagement between the runners and the windings. The runners may therefore swing about this pivotal point inwardly and outwardly under the pressure of the spring 54, the opposite yoke 57 sliding along the edge of the actuator, the slot 58 and the edge of the actuator which is preferably slightly arcuate readily permitting. This action is applicable for motion in either direction. If when the parts are in the position shown in Fig. 16 motion of the actuator 16 is reversed then the parts assume a like position as shown in Fig. 15, the right hand yoke 57 being then pulled by the projection 48 and the opposite yoke and projection telescoping or sliding with respect to each other. Fig. 15 shows how the stop arms 56 abut against the rivet head 38, and Fig. 3 shows how the spreading of the slot as the yoke extends to the runners gives ample clearance sidewise. Yoke portions 57 of the member 16 exert a substantial spring pressure towards each other, thus effecting good parallel electrical connections between the shoe 49 and actuator 16. The spring 54 and the two ends of the shoe form three electrical paths in parallel between the shoe and the actuator 16 which is grounded on the shell through sleeve 4.

The action of the runners upon the winding is unique. It will be seen that if a particle of dust or dirt should come upon the wires 21 so as to be in the path of the upper runner 50 it could ride over the particle by the shoe rocking slightly about the pivotal connection of the yoke 51 and projection 48 without causing disengagement of the lower runner 50 from the windings.

The runners 50, 50 travel along the margins of the resistor, as is plainly apparent from Figs. 3 and 8. It is along the margins that the flat sides of the coils have the greatest rigidity because of the binding effect upon the edge of the supporting strip 19. Also, as I shall hereafter explain, the coils are preferably cemented to the supporting strip 19 along the edges 79 and the center 80, see Fig. 13. The resistor strip may be considerably varied as to size of wire, number of turns, spacing of the turns, etc., without losing the advantage which my invention secures, but my invention is peculiarly applicable to and solves a difficult problem in connection with wires which are of small diameter and closely spaced. Whereas in rheostats of the prior art in which the contactor engages the edge of the resistor in order to secure greater bearing area it is necessary to widen the face of the contactor and hence short out a greater part of the winding, such is not a case in my invention. I secure the extended area by working along the length of the turn of wire instead of across a number of turns of the wire. It is obvious that if contact be made along the full length of the flat side of one coil conductivity far in excess of the cross-section of the coil may readily be obtained. In fact, only a short extent of contact along the wire will result in a conductivity as great as that of the wire itself.

The finer the winding and the smaller the pitch the less will be the inclination of a coil to the longitudinal axis of the strip. In other words, when the windings become as fine and as closely spaced as I have above indicated by the example of 466 turns to the inch, the turns are substantially at right angles to the longitudinal axis of the strip. The nearer the windings approach a right angle to the axis of the strip the more nearly do the two surfaces,—i. e. the wire and the runner,—at all times make line contact across the full width of the runner. The motion of the shoe along the coils proceeds in two alternately occurring stages throughout. Even though the shoes be conceived as presenting cylindrical surfaces the axis of which is accurately at right angles to the longitudinal axis of the strip, the two shoes will be bearing during one stage upon the same wire,—that is, a single turn,—and will short circuit only that much of the winding as is equal to the width of the shoe as a minimum, this being somewhat less than one-half a turn. The next stage follows when one of the shoes drops between two adjacent coils far enough to make contact with both while the other runner engages only the one coil. Consider in the example of Fig. 5 that the tangency of the lower runner 50 on the wire 59 occurs along the line $a$, the tangency of the upper runner 50 on the same wire occurs along the line $b$ and at the same time the upper runner has tangency with the next turn along the line $b'$. Upon further motion, the lower runner will touch two coils while the upper one touches only one. Thus coils are cut out not in complete turns but in two slightly unequal fractions giving the effect of twice the number of steps of devices of the prior art. Even though the winding be disposed cylindrically and the shoe be cylindrical in the same direction the internal tangency nevertheless gives a sharp and definite line contact of much greater conductivity than can be secured by the point contact which obtains in the case of a contactor resting upon the edge of the strip. Since the contact area involved is far greater than is possible to obtain commercially where contact is made on the edge of the strip, I am able to employ a greater pressure between the contacting members and at the same time have less pressure per unit of contacting area than has heretofore been possible to employ successfully in prior types of rheostats. As above explained, the presence of a particle of grit or dust under one of the runners does not impair the contact of the other runner with the winding and makes a total change of resistance of less than a complete turn even though the one runner be completely lifted from engagement with the winding. Therefore, such particles do not affect the contact resistance to a detrimental degree.

To insure smooth operation mechanically and electrically, the housing is completely closed to exclude dust and foreign particles, and in addition the resistor strip and the liner and all insulating parts within the shell are covered with a neutral oil which forms a film upon the metallic contacting parts. The oil film also surrounds the insulating strip and winding strip, thus preventing them from undergoing dimensional changes due to changes in their moisture contents.

In the assembly, in order to insure tightness of the resistor in the shell I prefer to dehydrate the strip 23 before the same is inserted in the shell. This dehydration contracts the same materially. After the rheostat is assembled the fiber liner is permitted to resume its normal moisture content, whereupon it expands and grips the resistor firmly. The oil is then introduced for the purposes above described.

The advantage of my method of making contact is that it gives the same effect electrically as a single contactor operating on a winding having twice as many turns per inch, as the two contact runners are almost one-half turn apart, which reduces the steps from one turn to about one-half turn. The runners are in transverse alignment and due to the pitch of the winding on the resistance strip one runner actually makes contact with the next turn of wire slightly ahead of the other runner, and since these runners are spaced about one-half turn apart the above effect is obtained.

While I have shown the terminals such as 28, 28 extending out through the cylindrical wall 2, it is to be understood that I do not wish to limit the invention to that manner of taking out the terminals. A fiber end liner or washer like the washer 36 may be disposed within the open end of the shell and the terminal portions may be extended through corresponding slits in such washer and slots or apertures in the cap or cover 47. Or, if the mounting permits, the taking out of the terminals may be through the end wall 3. The employment of the fiber for sealing the openings or apertures through which the terminals are projected is advantageous in preserving a complete closure. The soaking of the fibrous insulation in oil assists, also, in excluding foreign particles such as dust and the like. The shaft 5 fits in the sleeve 4 with a very close fit and the dimensions are held relatively close for end play, so that practically no opportunity for foreign particles to enter along the shaft exists.

While I have described the invention in the above embodiment in the form of an enclosed circular rheostat, obviously the broad principles of the invention and certain of the detail features apply equally well to other forms of rheostats, such for example, as the open longitudinal type shown in Figures 7 and 8. Here a resistance element 60 comprising a suitable insulating strip 62 and a wire winding 63 has its ends fastened by rivets 64, 64 to metal brackets 65, 65 connected by a metal bar 66, the ends of which are bolted to the upper ends of the brackets. Terminal screws 67 are mounted in insulated relation upon the brackets 65, 65, and connected to the ends of the winding 63. They are provided with binding posts 68, 68 for making electrical connection with a circuit to be controlled.

An actuator 69 having a sleeve 70 and a controlling knob 72 is guided on the bar 66 longitudinally of the resistor 60. This actuator 69 may be formed of a sheet metal stamping. It has the projections 48, 48 heretofore described hooking in the slots 58 of the shoe 49 and serving by means of the yokes 57, 57 to secure the same action described in connection with the embodiment of Figs. 1 to 3.

The actuator is arranged to have the hooks or projections 48, 48 abut against the terminal screws 67, 67 for limiting the motion of the actuator. The spring 54 is arranged to apply pressure to the spring seat on the bridging member 52 between the runners 50, 50 as described in connection with the previous embodiment.

In Figs. 9, 10, and 11 I have illustrated diagrammatically the novel method of making progressive contact whereby the resistance is included in the circuit in steps of less than a whole turn or coil of the rheostat winding. Assume that the two runners are represented by the flexibly connected contacting arrows $x$ and $y$, the first stage of operation is represented by Fig. 9 when contactor $x$ rests upon the left hand end of adjacent face of turn A and connected contactor $y$ rests upon the right hand end of the adjacent face of turn B. Now, it is seen that less than a complete turn or coil is short circuited by $x$ and $y$, for if the path of the short circuited portion be considered it will be seen to extend from the point of engagement of $x$ upon A to the point of engagement of $y$ upon B.

The next stage of operations is to shift the contactor $x$ from coil A to a corresponding point on coil B. The contact $y$ is not shifted. Now it will be seen that so much of the coil B as lies between contactors $x$ and $y$ is short circuited, and in effect considering the lower part of the resistor,—that is toward the bottom of the sheet, the result has been to carry the effective point of contact from the place where $y$ engages coil B to the point where $x$ now engages the coil B.

The next stage illustrated in Fig. 11 is then analogous to the stage shown in Fig. 9, that is the contactor $y$ is shifted from the right hand end of the coil B to a corresponding position on coil C. Progress throughout the entire switching is thus made in two stages, one stage of which introduces or cuts out slightly more than half a coil and the other stage of which introduces or cuts out the remainder of a complete coil,—that is, slightly less than a half coil.

In the actual use of the device of my invention the steps are so minute and smoothly made that it is difficult to perceive this progressive switching in fractions of a turn, but electrical measuring instruments for measuring the resistance quickly reveal it.

In the actual use of my rheostat it is to be observed that in shifting from one coil to the next with either of the runners 50 which correspond to the contactors $x$ and $y$ shown in Figs. 9, 10, and 11 the two runners move longitudinally together but are able to rock because of the central connection by yokes 57 and hooks 48, the central arrangement of the spring 54 and the fact that the central equalizer bar 52 lies above or back of the faces of runners 50. As the connecting bar does not lie flush with the faces of runners 50 it does not bear upon the central part of the coils as the runners proceed along the margins of the coil. Obviously, if the central part of the coils were depressed there would be no need to raise the bar 52. The lack of center contact is one of the factors which permit the stepping action above described.

In Fig. 12 I have shown an embodiment of the method of switching resistance in fractions of a coil. This rheostat is a constant impedance attenuator. The resistance wire 143 is mounted upon an insulating strip or base member 142 which may be constructed as a rotary rheostat or straight line rheostat. A compound contactor consisting in this case of two rigidly connected arms 144 having arcuate contacting portions at their ends 145 bears upon the edge of the resistance strip and engaging the coils of wire 143 in a line transverse to the longitudinal axis of the resistance strip. The center lines of the arcuate contacting portions 145 are accurately alined to be in the same transverse plane. The spring members 144 are rigidly secured to a collar 146 which is secured upon a rotatable shaft 147 by which the contacting runners 145 may be brought into engagement with all of the coils of the resistance strip. The action which is involved is substantially identical in principle with that disclosed in connection with Figs. 9, 10, and 11, except, however, that the switching of the resistance is now in equal, or substantially equal, parts of a turn. As a result, resistance is inserted or cut out by half turns instead of unequal fractions as shown above or in whole turns as disclosed in the prior art. Upon the annular or cylindrical wall 150 of the rheostat I insert an insulator 152 of a width slightly less than the width of the resistance element and of a thickness to prevent the tip of the arms 145 from engaging the wall 150.

*The resistor*

The resistor or resistance element 18 may be made up in a variety of forms and to secure various effects. I have above explained that a very large number of turns of fine wire may be mounted upon the strip of insulation 19. Preferably bare wire is employed, as with my method of making contact, bare wire with very little space between turns is entirely feasible and there is not the difficulty of removing the enamel, or other insulation, which is the case in rheostats where enameled wire or the like is employed.

The resistance strip may be wound with relatively coarse wire at a relatively coarse pitch. The advantages of the pulled runners are equally applicable to the larger sizes of wire and coarser pitch of winding, so far as securing good contact with a minimum effective loss of value of the resistance and finely graduated steps is concerned.

In most rheostats, the length of the resistance element is many times the length of the contacting surface of the contactor and consequently most of the wear will occur on the contactor. In the type of contactors used heretofore the same portion of the contactor rides on the resistance element regardless of the direction of rotation.

This subjects the contacting area of the contactor to very severe wear due to the fact that for a given amount of motion between two surfaces in contact with each other, more wear will occur if the motion is back and forth than if it is always in one direction. The reason for this is that motion in one direction tends to lay all minute surface projections in one direction and lodge all loose particles in pits on the contact surface, so that there is formed a comparatively smooth surface, that becomes more perfect with wear. When motion occurs first in one direction and then in the other, the minute projections on the contact surface are bent back and forth so as to soon break off, and any loose particles on the raceway are continually lodged in and dislodged from pits in the contactor or resistance element and shoved along between the surfaces in contact, causing scoring, poor contact, and rapid wear.

With the contactor of my invention the rocking action that occurs with reversal of movement of the actuating arm brings a different portion of the surface of the contactor into contact with the resistance element for each direction of motion. Therefore, since motion in either of two directions is possible, two contacting areas will be created, one with its center just slightly to one side of the transverse center line of the contactor and the other with its center line just slightly on the opposite side of the center line of the contactor, see Figs. 17 and 19. The distance between these two contacting areas may be increased by increasing the amount of rocking of the contactor upon reversal of motion, or by increasing the normal radius of curvature of its contacting surfaces. These two contacting surfaces, therefore, more than double the life of the contactor for the reason that the wear is equally distributed between the two surfaces on the contactor and each one travels in one direction only, when in contact with the resistance element.

Long life is further assured by the method of pulling the contactor along the resistance element which consists of a pivotal connection formed between a projection on the actuator and an aperture in the contactor at a position in advance of the contacting area. The contactor is then drawn along the resistance element by a force applied at the pivotal point and along a line through the contacting area and the pivotal point. This pivotal connection exerts a force on the contactor to cause it to move over the resistance element as the actuator is moved and also exerts a pressure on the contactor normal to the direction of motion to counteract the tendency of the front end of the contactor to tip down toward the resistance element as it is moved. The force applied by the actuator has two components acting at the contacting surface, one in a direction in the line of motion that is just great enough to overcome the friction between these two surfaces and causes motion of the contactor, and the other normal to the direction of motion and opposite the spring pressure applied to the contactor. The magnitude of this latter component depends on the angle between the resultant force and the direction of motion and the force exerted at the pivotal point. Therefore, if for some reason, an area of high friction develops on the resistance element, the frictional component between the contacting surfaces will increase and a greater force will be necessary to move the contactor. This in turn causes the component normal to the contacting surfaces that is exerted by the drawing force to increase and neutralize a part of the spring pressure so as to lower the pressure between the contacting surfaces and decrease the frictional component. Or in other words, drawing the contactor from a point in advance and above the surface of the resistance element gives a partial compensation for a variation in frictional component and tends to keep the torque required for rotation at a given value.

I do not intend to be limited to the details shown and described except as they are hereinafter recited in the claims.

I claim:

1. In a rheostat, a resistance element, a spring pressed contactor having a convex contacting surface positioned to contact said resistance element, an actuating member, coupling means for connecting said contactor to said actuating member to pull said contactor back and forth across said resistance element, said coupling means comprising spaced yieldable elements positioned to partially rotate said contactor and present different portions of said contactor to said resistance element when pulling said contactor in opposite directions.

2. In a rheostat, a resistance element, a spring pressed contacting shoe having a convex contacting surface, an actuator for partially rotating and sliding the contacting shoe upon the resistance element in opposite directions, alternately engageable members on said shoe and actuator for slidingly pulling different portions of said contacting surface on said resistance element upon reversal of the direction of movement of said actuator.

3. A variable resistance device comprising a resistance element, a contactor element engaging said resistance element, means including an oscillatable actuator for moving said contact element along said resistance element, alternatively active means pivotally connecting said actuator positively to said contact element whereby upon movement of said actuator in either direction of movement, said actuator draws said contact element along said resistance element, and resilient means engaging said actuator and bearing against said contact element to press the latter into engagement with said resistance element.

4. A variable resistance device comprising a resistance element, a partially rotatable sliding contactor engaging said resistance element, means for moving said contactor over said resistance element and including an actuator positioned to pivotally engage said contactor alternatively in either of two directions to partially rotate and then slide said contactor over said resistance element, and resilient means engaging said actuator and bearing against said contactor to press the latter against said resistance element.

5. In combination, a resistor comprising a closely wound resistance wire consisting of flat coils, a shoe for engaging the turns thereof, said shoe having a pair of alined convex runners engaging the flat coils adjacent the margins thereof, an actuator for the shoe having spaced hooks, the shoe having slotted ears connected to said runners on each side thereof, the slots lying in line between the runners, and the hooks engaging in the slots of said ears and serving to pull the runners in either direction, and spring means between the actuator and the shoe for pressing the runners against the coils.

6. In combination, a resistor comprising a closely wound resistance wire consisting of flat coils, a shoe for engaging the turns thereof, said shoe having a pair of alined convex runners engaging the flat coils adjacent the margins thereof, an actuator for the shoe having spaced hooks, the shoe having slotted ears connected to said runners on each side thereof, the slots lying in line between the runners, and the hooks engaging in the slots of said ears and serving to pull the runners in either direction, and spring means between the actuator and the shoe for pressing the runners against the coils, said runners having a bridge between them engaged by said spring means for equalizing the spring pressure between them.

7. In combination, a cylindrically disposed strip of insulation having a wire winding thereupon, a stop member disposed between the ends of the wire winding on said strip, a rotatable shaft concentric with the strip, a shoe for engaging the turns of the winding, said shoe comprising a pair of convex runners guided along the margins of the strip, an actuator arm rotatable with the shaft, said actuator arm having hooks angularly spaced from each other, the shoe having yokes on each side of the runners engaging the hooks, spring means disposed between the central part of the actuator arm and the central part of the shoe, and stop projections on the actuator arm on each side of the spring means and extending through the yokes for engaging said stop member.

8. A contact shoe comprising a pair of convex curved runners forming engaging faces, a pressure equalizer bar joining said runners, said bar having a spring seat disposed substantially equidistant between the runners, yokes connected to the opposite ends of the runners, said yokes converging from the runners to relatively narrow seats, said yokes being set back with respect to the engaging faces of the runners and the seats extending longitudinally back of and in front of the runners.

9. In combination, an actuator comprising a flat plate-like member, said member having hooks formed on the edges of the same spaced away from each other, a spring seat being formed on the edge of the actuator between the hooks, a contacting shoe comprising a pair of spaced convex runners having an equalizer bar between them and having their opposite ends extended to form converging yokes, said yokes having seats extending over and engaged by said hooks on the actuator, and a spring on the spring seat of the actuator engaging the equalizer bar.

10. In combination, a rotatable shaft, an actuator arm fixed on the shaft for rotation therewith, said arm having angularly spaced hooks, a contacting shoe comprising a pair of runners joined by an equalizer bar, the runners having extended portions forming converging yokes, seats at the extremities of said yokes hooked over said hooks, and spring means between the actuator arm and said equalizer bar of the shoe.

11. In combination, a rotatable shaft, an actuator arm fixed on the shaft for rotation therewith, said arm having angularly spaced hooks, a contacting shoe comprising a pair of runners joined by an equalizer bar, the runners having extended portions forming converging yokes, seats at the extremities of said yokes hooked over said hooks, spring means between the actuator arm and said equalizer bar of the shoe, and stop projections on the actuator arm in line with the openings of the yokes and disposed on each side of the spring means.

12. In combination, a resistance element comprising a closely wound resistance wire, a shoe for engaging the turns thereof, said shoe having a convex runner, an actuator for the shoe having spaced hooks, the shoe having yoke-like portions defining slots on each side of the runner face, said hooks engaging said yoke-like portions and serving to pull the shoe over the resistance element, and a spiral spring having a plurality of convolutions between the actuator and the central part of the shoe.

13. In combination, a cylindrically mounted wire wound resistance element, a shaft rotatably mounted substantially coaxial with the resistance element, an arm rotatable with the shaft, a contact shoe having a convex contact face extending lengthwise of the shaft, said arm having spirally radially acting spring means for pressing the shoe against the resistor and spaced lost motion connections between the arm and the shoe on each side of the contact face of the shoe for pulling the shoe in either direction of rotation of the shaft.

14. In combination, a resistance element consisting of flattened coils of resistance wire the turns of which are closely spaced on an insulator strip, a contact shoe comprising two spaced convex runners alined transversely of the resistance element and each runner bearing upon the flat side of the coils, an actuator for the shoe guided longitudinally along the resistance element, and spring means between the shoe and actuator, the shoe having an equalizer between the runners for equalizing the pressure of the spring means upon said runners, each runner being positioned adjacent the end of a convolution of resistance wire.

15. In combination, in a rheostat, a resistance element comprising a wide insulating strip upon which a resistance wire is wound, said resistance wire being rigidly supported at the longitudinal edges and longitudinal center of the insulating strip, a rotatable shaft, a contactor arm mounted on said shaft, a plurality of runners carried by said arm and having lost motion connection with respect thereto, a spring biased between said runners and said arm, and said runners adapted to engage the resistance wire adjacent the edges thereof.

16. A contact shoe comprising a plurality of spaced runners, a bridge connecting said spaced runners, upturned extensions longitudinally extending from each of said runners, and a transverse yoke connecting the end of each upturned extension.

17. A contact shoe comprising a plurality of spaced runners, a bridge connecting said spaced runners, upturned extensions longitudinally extending from each of said runners, and a transverse yoke between the end of each upturned extension and a plurality of upturned ears on said bridge.

18. A contact shoe comprising a plurality of spaced runners, each of said runners having a convex surface, and a plurality of bridges connecting said runners, at intermediate and extreme end portions thereof.

19. In a rheostat, a resistance element, an arcuate contactor in tangential engagement with said resistance element provided with yoke-like coupling means adjacent its ends, and an actuator having laterally spaced coupling means complementary to the coupling means on said contactor, said actuator being positioned to draw said contactor back and forth across the resistance element and to shift the line of tangency on said contactor from one portion thereof to another through cooperation of whichever is the leading pair of coupling means.

20. In a rheostat, a resistance element, a rockable contactor adapted to make substantially a transverse tangential line contact with said resistance element, coupling means adjacent each end of said contactor and spaced from the line of contact thereof, an actuator having laterally spaced coupling means complementary to the coupling means on said contactor and engageable therewith, said actuator being adapted to draw said contactor back and forth over said resistance element and to shift the tangential contact line from one portion of said contactor to another portion thereof through cooperation of the leading pair of coupling means on said contactor and said actuator.

21. In a rheostat, a resistance element, a spring-pressed shoe having slots therein, an actuator for drawing the shoe in either a forward or backward direction of movement and having projections complementary to the slots of the shoe, and said complementary slots and projections inter-engaging to effect a rocking motion of the shoe relative to the actuator and providing a pivotal connection of the shoe upon the projection drawing said shoe.

22. A variable resistance element having in combination, a resistor comprising flattened coils of resistance wire, a support for the same, a contact shoe comprising two spaced convex runners aligned transversely of the resistor, each slidingly bearing along the marginal portions of the flat side of the coils, an actuator for the shoe movable along the resistor, and spring means between the shoe and actuator, the shoe having an equalizer between the runners for equalizing the pressure of the spring means upon said runners.

23. In a rheostat, a resistance element, a spring pressed contactor positioned to contact said resistance element, an actuator for moving said contactor, a lost motion connection between said actuator and contactor, said contactor provided with a convex surface for contact with said resistance element, said convex surface having two contacting areas, one of which bears on the resistance element when the contactor is moved in one direction and the other bearing on the resistance element when the contactor is moved in the reverse direction.

NEWTON C. SCHELLENGER.

CERTIFICATE OF CORRECTION.

Patent No. 2,019,997.  November 5, 1935.

NEWTON C. SCHELLENGER.

It is hereby certified that error appears in the printed specification of the above numbered patent requiring correction as follows: Page 2, second column, line 65, beginning with the word "Another" strike out all to and including the word and period "switch." in line 71; page 4, second column, line 66, for "of" read and; and that the said Letters Patent should be read with these corrections therein that the same may conform to the record of the case in the Patent Office.

Signed and sealed this 17th day of December, A. D. 1935.

Leslie Frazer
Acting Commissioner of Patents.

(Seal)